June 18, 1946.  C. E. BEATTY  2,402,233
DRY SHAVER

Filed May 16, 1944

INVENTOR.
CLARENCE E. BEATTY
BY Martin E. Anderson
ATTORNEY.

Patented June 18, 1946

2,402,233

UNITED STATES PATENT OFFICE 2,402,233

DRY SHAVER

Clarence E. Beatty, Bremerton, Wash.

Application May 16, 1944, Serial No. 535,871

3 Claims. (Cl. 30—43)

This invention relates to improvements in manually operated dry shavers.

Since the introduction of the electric razor, which is operated by an electric motor, as the name implies, a demand has arisen for a similar device that can be operated manually and which can, therefore, be used in places where electricity is not available. Such devices would be useful for sportsmen, such as hunters, fishermen and trappers as well as for soldiers in active service.

This invention has reference to an improved construction of manually, operable dry shavers and the principal object of the invention is to produce a simple and effective apparatus that can be operated by natural hand movement which produces pressure and at the same time operates the shearing mechanism.

Another object is to produce a dry shaver of this type in which the action of the handle and the cutter are so related that the movement of one produces a corresponding movement of the other.

A further object of the invention is to produce a device of the class referred to, in which the contact between the cutter and the shear plate is released whenever the pressure on the handle is released, thereby preventing the pulling of hairs that might be positioned between the shear plate and the cutters.

A further object is to produce a device in which the pressure exerted by the cutter on the shear plate is equalized by means of corrugations so to prevent damage of the cooperating parts due to excessive pressure.

A still further object of the invention is to produce a device of the type specified in which the handle is provided with inner surfaces that serve as guides to constrain its movements during operation.

Having thus briefly described the invention, the same will now be described in detail, and for this purpose reference will be had to the accompanying drawing in which the invention has been illustrated, and in which.

Figure 4:
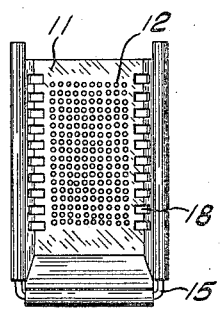
Figure 4 is a view looking downwardly into the shear plate.

In the drawing reference numeral 10 designates the shear plate as a whole. The bottom of the shear plate has been designated by reference numeral 11 and is provided with a large number of openings 12, like those shown in Figure 4. These openings can be staggered or aligned as shown. Extending upwardly at an angle from the bottom are sides 13 that terminate in outwardly extending upwardly concave flanges 14, on which the wire frame 15 rests. The sleeve 16 encloses the flange 14 and the wire 15 at the upper end of each side and this sleeve is upwardly concave and terminates in a guide edge 17 to which reference will hereinafter be made.

Figure 1:
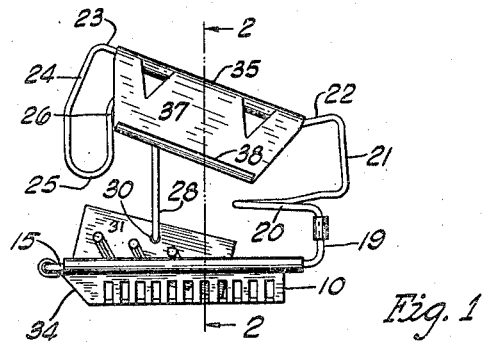
Figure 1 is a side elevation of the dry shaver.

Attention is called to the fact that the sides of the shear plate are provided with openings 18 for the purpose of permitting long hairs to enter. The wire 15, which is held in place by the sleeve 16, has an upwardly extending portion 19 which is shown most clearly in Figures 1 and 3. This terminates in a loop 20, which in turn terminates in an upwardly extending portion 21 from the top of which that portion of the spring or wire which has been designated by reference numeral 22, is downwardly inclined and from this a straight portion 23 extends towards the left as shown in Figure 1 and is then turned downwardly as designated by reference numeral 24. Part 24 terminates in a reverse curve 25 and the spring wire extends upwardly as shown at 26, making another reverse curve at 27 and extends thence downwardly as indicated at 28. The lower ends are bent inwardly and terminate in right angular portion 29 that extend through openings 30 in the cutter element 31.

Figure 5:
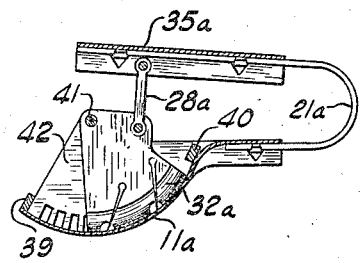
Figure 5 is a fragmentary view showing a slightly modified form of construction.
Figure 2:
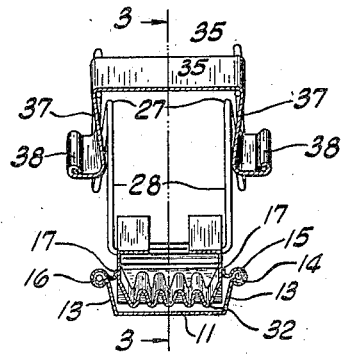
Figure 2 is a section taken on line 2—2, Figure 1.
Figure 3:
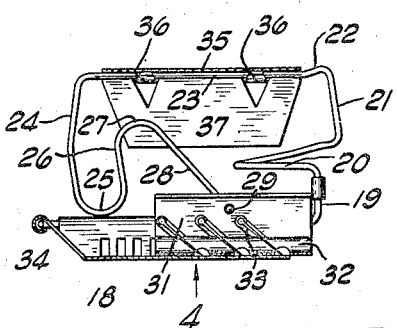
Figure 3 is a section taken on line 3—3, Figure 2.

The cutter element comprises a bottom that has been provided with longitudinally extending corrugations 32 that are shown most clearly in Figure 2. These corrugations are slotted at an angle for the reception of the blades 33 whose positions are shown most clearly in Figure 3. Suitable means such as openings in the side walls as shown in Figures 1, 3 and 5 is provided for holding the blades in properly adjusted position. The wire frame 15 extends across the front of the apparatus as shown in Figure 1 and secured to this is a downwardly extending guide wall 34 that serves to lift the cutter when it returns to inoperative position. Secured to the two parallel portions 23 of the frame is a sheet metal handle that has been designated by reference numeral 35. This is held in place by means of tongues 36 cut from the material or in any other suitable way. The sides 37 of the handle extend downwardly and terminate in outwardly extending flanges 38 that provide rests for the tip of the fingers while operating the shaver. The sides of the cutter element below the inturned pivots 29 of the downwardly extending springs 28 are so positioned that when pressure is applied to the handle for operating the cutter the latter will slide between the guides 17, which prevent the cutter plate from moving laterally to such an extent that the corners of the blades will come into contact with the sides of the shear plate and damage it. The shear plate must be made of very thin material, it is important that means shall be provided to prevent the corners of the blades from contacting the sides and guides 17 perform this function.

Let us now assume that the parts are in the position shown in Figure 1 and that pressure is applied to the handle 35. When this moves downwardly, it produces a force urging the cutter downwardly along the inclined wall 34 and also produces a force having a component urging the cutter towards the right and the latter will therefore move to the position shown in Figure 3, shearing any hairs that may project through the holes in the shear plate. When pressure is released, the parts move in the opposite direction until they finally assume the position shown in Figure 1.

It will be observed that due to the action of the spring and also to the action of the inclined end wall 34, the cutter is lifted from the shear plate as it comes to normal position and this prevents any hairs from becoming anchored and thus prevents pulling when the shaver is removed.

When pressure is applied to the handle when in the position shown in Figure 1, the cutter 31 will begin to slide towards the right, and, due to the resilient mounting of the handle, it will move slightly towards the left, thereby producing a balanced effect that prevents the shear plate from moving in the direction of the cutter.

The motion of the shaver should, preferably, be in the direction of the length of the shear plate, however, a side motion against the grain of the beard previous to the shear stroke may be desirable to permit long hairs to enter through openings 18.

The dry shaver illustrated and described has been so designed that it can readily be constructed almost entirely by means of dies and suitable wire bending machines and which can therefore be made with a comparatively small outlay of material, cost and labor.

Attention is called, in particular, to the corrugation 32 whose surfaces contact the inner shear plate surface. The blades 33 are positioned with their cutting edges in the plane of the inner corrugation surfaces which distribute the pressure evenly over the entire surface of the shear plate during the shearing operation.

In Figures 1, 2, 3 and 4, the shear plate has been shown as provided with a bottom lying in a plane. It is possible, however, to so construct this device that the cutter, instead of reciprocating, will turn about a pivot and in which the blades will follow a cylindrical path. In Figure 5, a diagrammatic representation of such a shaver has been shown. In this modification the handle has been designated by reference numeral 35a and a shear plate by reference numeral 11a. The cutter is provided with longitudinal corrugations 32a. The handle is connected with the shear plate by means of a spring 21a and it is further connected with the cutter by means of a connecting rod 28a. Stops 39 and 40 limit the oscillation of the cutter to a predetermined angle. The corrugations 32a perform the same function as the corrugations 32 in the other embodiment and when the pivot 41 is smaller than the opening in the cutter element corrugations 32a distribute the pressure as above explained.

The two modifications shown, although slightly different, operate in substantially the same way, each comprising a shear plate, a cutter movable relative thereto, a handle resiliently connected with the shear plate and operatively connected with the cutter so as to move the latter relative to the shear plate when pressure is exerted on the handle. In connection with the embodiment shown in Figure 5, attention is called to the fact that it can be operated without any pressure being exerted on the shear plate as the operator grasps the handle that projects to one side of the shear plate and by exerting pressure thereon can oscillate the cutter, whether or not the latter is resting against a surface and this makes it possible to gauge the amount of pressure applied to the face to any extent desired.

Having described the invention what is claimed as new is:

1. A manually operable dry shaver comprising, in combination, a shear plate having perforations for the reception of hairs, a cutter element mounted for movement relative to the shear plate, cutter blades removably secured to the cutter element, a handle movably connected with the shear plate, resilient means for urging the handle away from the shear plate, the cutter element having transverse slits for receiving and positioning the blades, and means operatively interconnecting the handle and the cutter element to produce relative shearing movement between the blades and the shear plate when the handle is moved relative to the latter.

2. A manually operable dry shaver comprising, in combination, a shear plate having a transversely straight, foraminated shear surface and side walls extending at an angle therefrom, a cutter element positioned between the side walls and movable along the foraminated surface to cut any hairs extending through the openings, a handle connected with the shear plate for movement towards and from the latter, means operatively interconnecting the cutter and the handle to move the former relative to the shear plate when the handle moves relative to the shear plate, means for distributing the pressure of the cutter over the foraminated shear plate surface, and means for separating the cutter and the shear plate when the handle approaches its maximum distance from the shear plate.

3. A manually operable dry shaver comprising, in combination, a foraminated shear plate having side walls extending angularly from one side thereof, a spring frame secured to the edges of the side walls, a cutter element positioned between the sides and mounted to reciprocate relative to the shear plate, a handle connected with the spring frame and mounted for movement relative to the shear plate, means interconnecting the cutter and the handle for reciprocating the cutter relative to the shear plate when the handle moves relative to the shear plate, and means comprising the side walls for guiding the cutter element, and means integral with the cutter element for distributing the pressure exerted thereby evenly over the shear plate surface.

CLARENCE E. BEATTY.